(12) United States Patent
Fockens

(10) Patent No.: US 6,181,248 B1
(45) Date of Patent: *Jan. 30, 2001

(54) DEACTIVATABLE ARTICLE SECURITY LABEL WITH DATA CARRIER FUNCTION

(75) Inventor: Tallienco Wieand Fockens, Rietmolen (NL)

(73) Assignee: N.V. Nederlandsche Apparatenfabriek NEDAP, Groenlo (NL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/077,518
(22) PCT Filed: Nov. 29, 1996
(86) PCT No.: PCT/NL96/00471
§ 371 Date: May 29, 1998
§ 102(e) Date: May 29, 1998
(87) PCT Pub. No.: WO97/22085
PCT Pub. Date: Jun. 19, 1997

(30) Foreign Application Priority Data

Nov. 29, 1995 (NL) .................................................. 1001770

(51) Int. Cl.⁷ .................................................. G08B 13/14
(52) U.S. Cl. ..................................... 340/572.3; 340/572.5
(58) Field of Search ............................... 340/572.3, 572.5

(56) References Cited

U.S. PATENT DOCUMENTS

| | | | |
|---|---|---|---|
| 4,196,418 | * | 4/1980 | Kip et al. ......................... 340/825.31 |
| 4,567,573 | | 1/1986 | Hashimoto et al. .................. 364/900 |
| 4,745,401 | * | 5/1988 | Montean ............................ 340/572.3 |
| 5,103,210 | * | 4/1992 | Rode et al. ........................ 340/572.3 |
| 5,111,186 | * | 5/1992 | Narlow .............................. 340/572.5 |
| 5,546,447 | * | 8/1996 | Carney et al. .................. 340/572.5 X |

FOREIGN PATENT DOCUMENTS

| | | |
|---|---|---|
| 0576100 | 12/1993 | (EP) . |
| 0638872 | 2/1995 | (EP) . |
| 79476 * | 9/1978 | (LU) . |
| 8304413 * | 12/1983 | (NL) . |
| 04282 * | 7/1987 | (WO) . |

* cited by examiner

Primary Examiner—Thomas Mullen
(74) Attorney, Agent, or Firm—Jacobson, Price, Holman & Stern, PLLC

(57) ABSTRACT

The invention relates to an article security label adapted for repeated activation and deactivation using a semiconductor memory element. This label is also deactivatable with the existing deactivator technology. Also, the label can be provided with more than one memory element which can be written and read out again by a read/write device, so that this article security label can fulfil a secondary function as a data carrier.

22 Claims, 3 Drawing Sheets

DEACTIVATABLE ARTICLE SECURITY LABEL WITH DATA CARRIER FUNCTION

BACKGROUND OF THE INVENTION

1. Field of the Invention

The invention relates to a deactivatable article security label in which the deactivation function is combined with an electronic data storage function.

2. Description of the Related Art

Deactivatable article security labels are known. Such a label is described, for instance, in U.S. Pat. No. 4,567,573 to Hashimoto. It consists of a metal coil, printed (etched) on a plastic foil, and two capacitor plates on opposite sides of this foil, connected with the two ends of the coil. The coil and the thus formed capacitor constitute a resonance circuit. When the label moves through a magnetic alternating field, for instance between the pillars of a shoplifting detection system arranged at the exit of a shop, the label, if the frequency of that alternating field coincides with the resonance frequency of the label, will return a signal as a result of the resonance effect.

In the capacitor part a weakening is provided where, at a relatively low voltage between the capacitor plates, flashover occurs between these plates. This gives rise to a permanent short-circuit, so that the label in question exhibits no electric resonance anymore, no longer returns a signal in the magnetic alternating field, and has thus been deactivated.

This category of labels has already been in use for quite some time now. In principle, the shop is the place where the label is affixed to the article to be protected. When the product is being checked out, the label is deactivated so that the passage of the buyer with the product in question through the exit of the shop does not cause an alarm to go off.

Some problems arising with this category of labels are:
1. some labels do not allow of deactivation, so that these labels have to be removed by hand;
2. after deactivation, some labels become active again because the short-circuit between the capacitor plates disappears spontaneously as a result of the handling and deformation of the label;
3. they are not reactivatable.

There is a development going on in the market whereby the labels are affixed by the manufacturer of the products to be protected, called 'source-tagging'. This saves handling costs at the retailer's. A problem involved is that not all retailers who sell the product in question utilize a shoplifting detection system. Those who do not have one, then also do not have the possibility of deactivating a label present on the product when the product is being checked out. As a consequence, products with active labels end up on the street. This can lead to a situation where persons unknowingly carry with them a product with an active label in it. If this person enters a shop which does have a shoplifting detection system, an alarm goes off at that instant. This is in fact a false alarm which cannot be distinguished from an alarm caused by a real shoplifter, and thus gives rise to a most embarrassing situation for the person in question and for the shopkeeper.

As for source-tagging, whereby a label is integrated into the product or into the package thereof, the above means that:
either the label coming from the factory must be in the non-active state and may only be activated in the shop where a shoplifting system is present;
or all shopkeepers should have a deactivation device available.

The conclusion is therefore that there is a need for a label that can be activated as well as deactivated with a high degree of reliability.

SUMMARY OF THE INVENTION

The object of the invention is to meet the above-mentioned need. For reasons of compatibility it is moreover desired that such a label can be deactivated at least with the existing deactivator devices.

The solution according to the invention is based on the use of a semiconductor memory element as a switch for determining the active or the inactive state of an article security label. In fact, every semiconductor memory element is a switch. In this case a type is needed that maintains its state also when the supply voltage of the memory circuit is not present, and which can be reset several times as is common in, for instance, an EEPROM.

A useful technique for this semiconductor switch is that of the 'Isolated Gate Transistor', but semiconductor memory elements made by other techniques, whether existing or yet to be developed, are also considered to fall within the scope of this invention.

BRIEF DESCRIPTION OF THE DRAWINGS

Hereinafter the invention is further described with reference to the drawings.

DETAILED DESCRIPTION OF THE EMBODIMENTS

Figure 1:
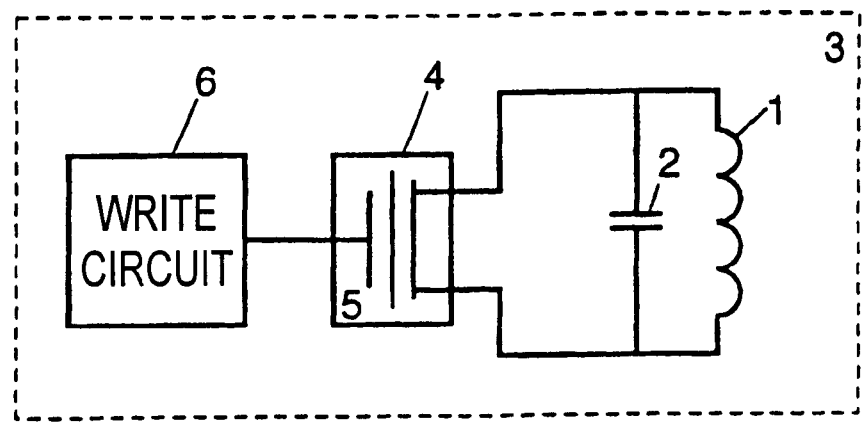
FIG. 1 shows a schematic circuit diagram of a label according to the invention.

FIG. 1 shows a schematic circuit diagram of a label according to the invention. The coil 1, which couples to the interrogating magnetic alternating field, and capacitor 2 together form the resonance circuit of label 3. Connected in parallel with the capacitor 2 is the memory and switching element 4, in which, by way of example, the isolated gate transistor, 5 is drawn. The memory element 4 can be programmed or written by means of the write circuit 6. If the memory and switching element 4 is in the "open" state and hence represents an infinitely high resistance, the circuit of coil 1 and capacitor 2 is not loaded. This circuit will start to resonate if it is introduced into a magnetic alternating field whose frequency is equal to the resonance frequency of the circuit determined by the values of the self-induction of coil 1 and the capacity of capacitor 2. During resonance, coil i will generate its own, secondary magnetic alternating field, which field is detectable at a distance. The label is thus in the active or activated condition. If the memory and switching element 4 is in the "closed" state and hence forms a short-circuit, the resonance circuit will be unable to resonate and hence unable to generate a detectable secondary alternating field. The label is then in the deactivated condition.

Figure 2:
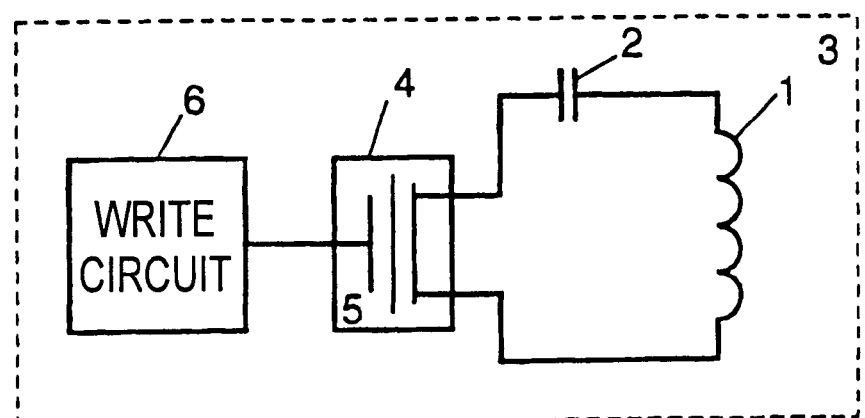
FIG. 2 shows an embodiment as in FIG. 1, but with the resonance circuit elements connected in series.

FIG. 2 shows a variant. Instead of being connected in parallel, the coil 1, capacitor 2 and memory and switching element 4 are now connected in series. The activated condition now occurs in the closed state of the memory and switching element 4. In the open condition the label is deactivated.

For the principle of the invention it makes no difference whether the connection is a series or a parallel connection. Therefore, hereinafter only the parallel solution will be described, but the equivalent solution with the resonance circuit elements connected in series is equally considered to fall within the scope of the invention.

For the purpose of an article security label, it should be possible for the activation and deactivation, i.e. the programming of the memory and switching element 4, to be performed in a contactless manner. This can be done most conveniently with a magnetically inductive coupling. This means that a second coil is coupled to the write circuit 6. However, for reasons of costs and simplicity of the label, it is highly desirable that this second coil be combined with coil 1. However, as appears from FIG. 1, coil 1 is short-circuited in the deactivated condition, so that signals are transmitted in that condition and the activation operation is thus impossible. This problem is solved in that in the deactivated condition of the label, the circuit is not short-circuited entirely, but an additional capacitor 7 (see FIG. 3) is connected in parallel, so that the resonance frequency is shifted to such an extent that this frequency lies outside the detection range of the shoplifting detection system. This means that such a label is not detected if it moves through the magnetic alternating field of the shoplifting detection system. However, if the label is disposed in the field of a special programming station, which is capable of adjusting itself both to the resonance frequency of the activated condition and to the resonance frequency of the deactivated condition, then communication is possible in both conditions.

Figure 3:
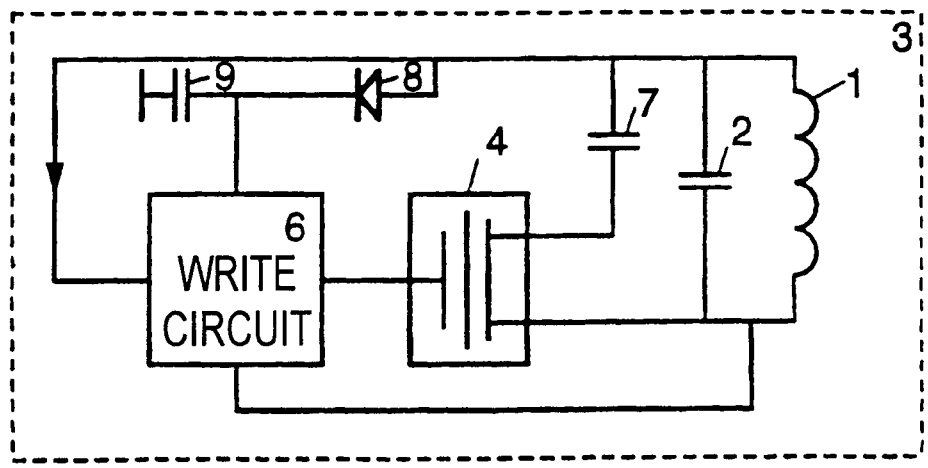
FIG. 3 shows a function diagram of the embodiment as represented in FIG. 1, with an additional capacitor connected in parallel.

FIG. 3 shows a functional diagram of the label referred to above. Capacitor 7 can be connected in parallel with capacitor 2 via the memory and switching element 4. Thus the resonance frequency in the deactivated condition is lowered from, for instance, 8.2 MHz to 6.8 MHz. Coil 1 is connected with write circuit 6. Also, the voltage across the resonance circuit is utilized, by means of diode 8 and reservoir capacitor 9, to generate a direct voltage with which circuit 6 can be supplied. Now, by modulating the signal which is generated by the programming station, for instance by varying the amplitude of that signal, a coded signal can be transferred, so that write circuit 6 can cause the memory and switching element 4 to change its condition. The programming station can measure the resonance frequency of the label and derive therefrom the condition the label is in (activated or deactivated). Then the programming station can determine the frequency at which it should emit a coded signal to modify the condition of that label.

The manner in which a programming station can program a data bit in a label has previously been described in applicant's European patent publication No. EP 638 872A1. These and related techniques are assumed to be known and apply to the present invention.

Figure 4:
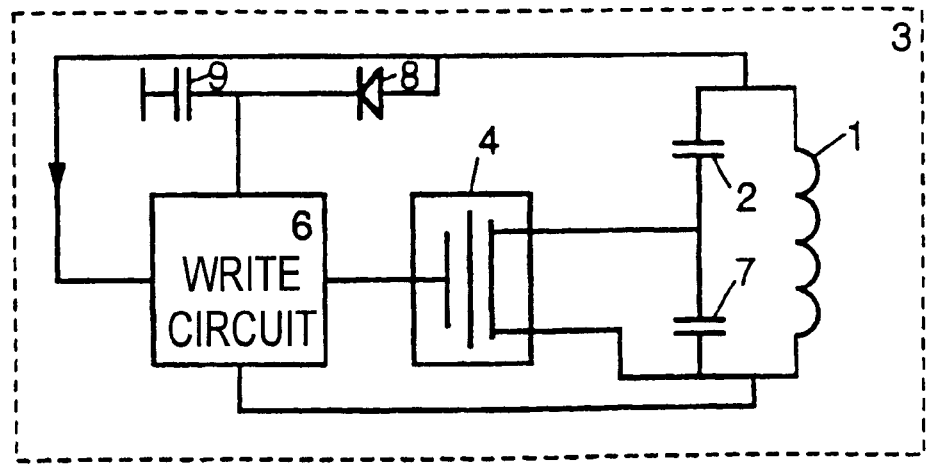
FIG. 4 shows a similar diagram to FIG. 3, but with the additional capacitor connected in series.

A variant of the circuit of FIG. 3 is shown in FIG. 4, where the second capacitor 7 and capacitor 1 are not connected in parallel but in series. The equivalent capacitance of this series connection of the two capacitors is less than each of the capacitors alone. In the circuit of FIG. 4, the memory and switching element 4 can short-circuit capacitor 7, which leaves only capacitor 2 in the series connection, resulting in an effective increase of the capacity. In this manner too the resonance frequency of the label circuit is shifted.

In view of the requirement of downward compatibility, it must also be possible for the above-described label to be deactivated with the existing deactivator techniques. In these techniques, use is made of a burst of high-frequency energy, which causes the breakdown of the capacitor in the original label technique. This high-frequency energy is supplied either by feeding a high-energy and wideband pulse to the deactivator antenna or by feeding for a short time a high-frequency sine wave with a considerable power. Both methods momentarily cause the label circuit to exhibit a resonant rise with a large amplitude, so that the high capacitor voltage required for breakdown is attained. A label according to the invention can thus also enter the field of such a deactivator. The deactivator then starts to deliver high-energy bursts. Firstly, the label should not become defective and, secondly, as a result of such a deactivation burst, the memory and switching element 4 must be set in the deactivated state. To that end, the write circuit 6 is provided with a voltage protection circuit which can absorb an excess of highfrequency energy induced in the label resonance circuit, and as a result of which the voltage across the capacitors 2 and 7 and other components of the circuit can remain below safe limits. The write circuit is further provided with a second subcircuit which recognizes the single pulse shape of the energy burst and then sets the memory and switching element 4 in the deactivated state. The details of the above-mentioned two subcircuits are not discussed here. They can be realized with techniques known to those skilled in the art.

The above-described label contains one memory element. Since a write circuit is already present, the label can be simply extended by adding more memory elements. If these memory elements can likewise be read out via the resonance circuit present, the function of the article security label can be extended with a data carrier function. This function can for instance be utilized to assign a serial number to a product and/or to write the date of purchase when the product is being checked out, which can be of importance for determining the warranty period later.

Figure 5:
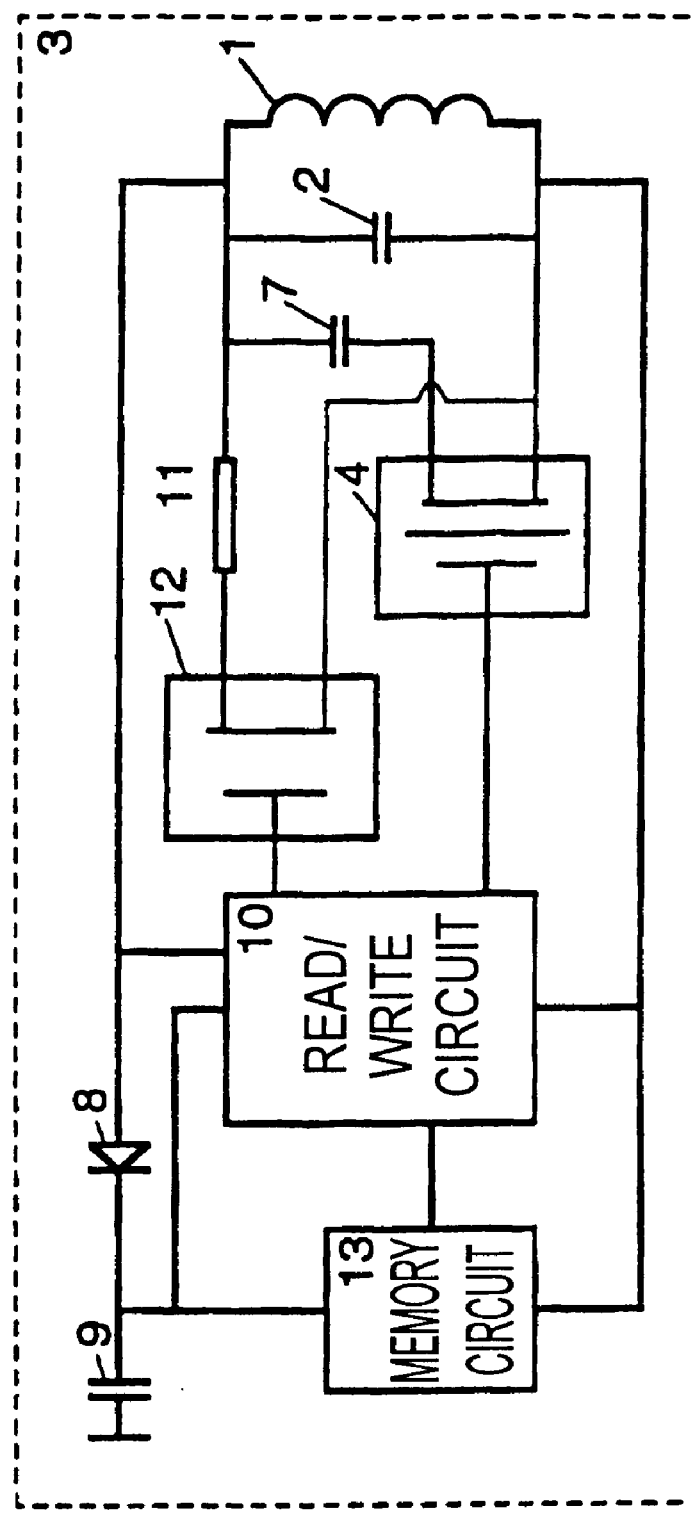
FIG. 5 shows the schematic circuit diagram of a combined article security and data carrier label.

FIG. 5 shows the schematic circuit diagram of a combined article security and data carrier label. The write circuit 6 in FIG. 3 has been replaced with the read/write circuit 10. This read/write circuit 10 can modulate the Q factor of the resonance circuit formed by coil 1 and capacitor 2 by connecting parallel resistance 11 in parallel with coil 1 by means of a switching transistor 12. Read/write circuit 10 switches transistor 12 on and off in accordance with the coded data stored in memory circuit 13. This coding can occur, for instance, as follows: the data bits stored in the memory circuit 13 are scanned one by one and passed to switch 12. If the data bit is a 1, transistor 12 is made conductive, so that resistance 11 is connected in parallel with coil 1. As a result, the resonance is additionally damped, that is, the Q-factor is lowered. The consequence is that the secondary magnetic field generated by coil 1 decreases in strength. On the receiving side of a read/programming station this decrease in field strength is detected and converted to a received data bit. If the data bit in the memory was a 0, transistor 12 would remain open, so that no additional damping of the resonance circuit would occur. This manner of data transfer is also known from applicant's U.S. Pat. No. 4,196,418.

A further developed form of data transfer is known from applicant's European patent publication No. EP576100A1, where use is made of phase shift keying (PSK) of an auxiliary carrier, in particular the special forms thereof, such as the Manchester and Bi-phase coding. These coding forms are applicable in the uses as described in this invention.

The variant with the series connection of capacitor 2 and capacitor 7 as shown in FIG. 4 is also possible with the above-described circuit in FIG. 5. This variant is not drawn separately, but is considered to be a part of the invention, as are any other variants of the configuration of the resonance circuit consisting of coil 1, capacitor 2, and capacitor 7.

The combined article security and data carrier label should also feature downward compatibility with existing deactivators. This is realized by also adding to the read/write circuit 10 the protection circuit and the deactivation pulse recognition circuit such as they have been added in the above-described write circuit 6.

What is claimed is:

1. An article security label comprising a resonance circuit including a coil and a capacitor, and a semiconductor memory and switching circuit connected to the resonance circuit for activating and deactivating the label, the semiconductor memory and switching circuit having a memory function and a switch function, wherein the open or closed state of the semiconductor memory and switching circuit determines whether the label is activated or deactivated, without changing a resonance frequency of the resonance circuit, by controlling whether the resonance circuit is enabled to resonate.

2. Article security system including a plurality of labels as claimed in claim 1.

3. The article security label as set forth in claim 1, wherein closure of said semiconductor memory and switching circuit forms a short-circuit in said resonance circuit to deactivate the label while opening of said semiconductor memory and switching circuit does not form a short-circuit in said resonance circuit, resulting in activation of the label.

4. The article security label as set forth in claim 1, wherein closure of said semiconductor memory and switching circuit completes said resonance circuit to activate the label while opening of said semiconductor memory and switching circuit opens said resonance circuit to deactivate the label.

5. An article security label comprising a resonance circuit including at least a coil and at least a capacitor, the label further having a semiconductor memory and switching circuit connected to the resonance circuit for activating and deactivating the label, the semiconductor memory and switching circuit having a memory function and a switching function, wherein a state of the semiconductor memory and switching circuit determines whether the resonance circuit is tuned to a first resonance frequency determined by said coil and capacitor or to a second resonance frequency, said label being activated as a result of the resonance circuit being tuned to said first frequency and being deactivated as a result of the resonance circuit being tuned to said second frequency such that said label, when deactivated, will not respond to an interrogation signal on the first frequency, wherein the label is arranged to receive an electromagnetic signal on the first frequency to chance the resonance frequency to the second frequency for deactivating the label and to receive an electromagnetic signal on the second frequency to chance the resonance frequency to the first frequency to activate the label.

6. The article security label as claimed in claim 5, comprising an additional capacitor which is connected to be added as parallel capacitor to the resonance circuit by the semiconductor circuit in order to obtain the second frequency.

7. The article security label as claimed in claim 5, comprising an additional capacitor which is connected in series with the capacitor of the resonance circuit and which can be short-circuited by the semiconductor memory circuit in order to obtain the second frequency.

8. The article security label as claimed in claim 5, comprising a control circuit for controlling the state of the semiconductor memory circuit.

9. The article security label as claimed in claim 8, wherein the control circuit is programmed to activate and deactivate the label by a coded signal supplied by a programming station.

10. The article security label as claimed in claim 9, wherein the control circuit is connected to the resonance circuit and the coded signal is received from the programming station by the coil of the resonance circuit.

11. The article security label as claimed in claim 8 wherein the control circuit has a first subcircuit for absorbing an excess of energy from a deactivation signal and a second subcircuit for recognizing the deactivation signal and providing a signal to the semiconductor memory circuit in order to deactivate the label.

12. The article as set forth in claim 11, wherein the first subcircuit is a voltage protection circuit and the deactivation signal comprises a high frequency burst of energy.

13. An article security label comprising a resonance circuit including a coil and a capacitor, the label further having a semiconductor memory circuit connected to the resonance circuit for activating and deactivating the label, the semiconductor memory circuit having a memory function and a switch function, wherein the state of the semiconductor memory circuit determines whether the label is activated or deactivated, wherein the label has additional memory elements and data can be written into and read from the additional memory elements by a read/write station via the coil.

14. The article security label as claimed in claim 13, comprising a control circuit for controlling the state of the semiconductor memory circuit.

15. The article security label as claimed in claim 14, wherein the control circuit is programmed to activate and deactivate the label by a coded signal supplied by a programming station.

16. The article security label as claimed in claim 15, wherein the control circuit is connected to the resonance circuit and the coded signal is received from the programming station by the coil of the resonance circuit.

17. The article security label as claimed in claim 14, wherein the control circuit has a first subcircuit for absorbing energy from a deactivation signal and a second subcircuit for recognizing the deactivation signal and providing a signal to the semiconductor memory circuit in order to deactivate the label.

18. An article security label comprising a resonance circuit including a coil and a capacitor, the label further having a semiconductor memory circuit connected to the resonance circuit for activating and deactivating the label, the semiconductor memory circuit having a memory function and a switch function, wherein the state of the semiconductor memory circuit determines whether the label is activated or deactivated, wherein the label can be deactivated by a magnetic field of short duration and large amplitude, but whereby the label is not damaged and remains reactivatable, rereadable and rewritable.

19. The article security label as claimed in claim 18, comprising a control circuit for controlling the state of the semiconductor memory circuit.

20. The article security label as claimed in claim 19, wherein the control circuit is programmed to activate and deactivate the label by a coded signal supplied by a programming station.

21. The article security label as claimed in claim 20, wherein the control circuit is connected to the resonance circuit and the coded signal is received from the programming station by the coil of the resonance circuit.

22. The article security label as claimed in claim 19, wherein the control circuit has a first subcircuit for absorbing energy from a deactivation signal and a second subcircuit for recognizing the deactivation signal and providing a signal to the semiconductor memory circuit in order to deactivate the label.

* * * * *